(12) United States Patent
He (10) Patent No.: US 7,309,011 B2
(45) Date of Patent: Dec. 18, 2007

(54) METHOD OF AUTHENTICATING PRODUCTS USING HARDWARE COMPATIBILITY FLAG

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 268 days.

(21) Appl. No.: 11/140,794

(22) Filed: May 31, 2005

(65) Prior Publication Data

US 2006/0091209 A1    May 4, 2006

Related U.S. Application Data (63) Continuation-in-part of application No. 11/039,682, filed on Jan. 19, 2005, which is a continuation-in-part of application No. 10/977,597, filed on Oct. 29, 2004.

(51) Int. Cl.
*G06F 19/00* (2006.01)
(52) U.S. Cl. ............. 235/385; 235/462.01; 235/462.09
(58) Field of Classification Search ........... 235/462.01, 235/462.09, 462.24, 462.34, 454, 385
See application file for complete search history.

(56) References Cited

U.S. PATENT DOCUMENTS 5,512,739 A * 4/1996 Chandler et al. ...... 235/462.09
6,343,695 B1 2/2002 Petrick et al.
2002/0024215 A1* 2/2002 Wong ........................... 283/72
2002/0170966 A1 11/2002 Hannigan et al
2003/0147549 A1* 8/2003 Choi et al ................... 382/100
2003/0210805 A1* 11/2003 Lofgren et al .............. 382/100

FOREIGN PATENT DOCUMENTS

WO    PCT/US06/020354    2/2007

* cited by examiner

*Primary Examiner*—Ahshik Kim
(74) *Attorney, Agent, or Firm*—Tarolli, Sundheim, Covell & Tummino LLP (57) ABSTRACT

A method of identifying or authenticating a product by providing an analog identification indicium including a randomized pattern of identification features on a first part of the product wherein one or more attributes of the randomized pattern of identification features correspond to an item identifier. A digital identification record is provided on a second part of the product including an encoded digital version of the item identifier, the first and second parts being separable when the product is used. The randomized pattern of identification features of the analog identification indicium is read and decoded to generate an item identifier and the digital identification record is read and decoded to generate an item identifier. The product is deemed authentic if the item identifier from the analog identification indicium substantially matches the item identifier from the digital identification record.

25 Claims, 6 Drawing Sheets

METHOD OF AUTHENTICATING PRODUCTS USING HARDWARE COMPATIBILITY FLAG

CROSS-REFERENCE TO RELATED APPLICATION

The present invention is a continuation-in-part of U.S. application Ser. No. 11/039,682 filed on Jan. 19, 2005 and entitled "Method of Authenticating Products Using Analog and Digital Identifiers" which is a continuation-in-part of U.S. application Ser. No. 10/977,597, filed on Oct. 29, 2004 and entitled "Analog and Digital Indicia Authentication." The '597 and '682 applications are incorporated herein in their entirety by reference.

FIELD OF THE INVENTION

The present invention relates to a system and method of authenticating a product using a combination of analog and digital identifiers including an analog identification indicium and a corresponding digital identification record and, more specifically, to a system and method of authenticating a product wherein the analog identification indicium or digital identification record includes a hardware compatibility flag that indicates one or more types of stimulus that can be used to read the analog identification indicium.

BACKGROUND

There is an increasing concern over counterfeit products including software, music CDs, and over-the-counter and prescription drugs entering the U.S. market. Counterfeit products not only depress profits of legitimate manufactures, but consumers who unknowingly purchase counterfeit products are being misled. Because of health issues involving counterfeit drugs, this is a paramount concern of drug manufacturers and governmental agencies. The concern is exacerbated because of the ready availability of lower cost prescription drugs from Internet pharmacies and drug stores with undisclosed sources for the product they provide.

Because of governmental regulations and/or to prevent unauthorized tampering, many prescription and over-the-counter drugs are packaged in containers using tamper-resistant seals. The consumer purchasing a drug product must break or destroy the tamper-resistant seal in order to open the container and access the product. While such tamper-resistant seals effectively thwart tampering, sophisticated counterfeit drug manufacturers may manufacture containers that include a tamper-resistant seal. Thus, tamper-resistant seals do not adequately address the issue of counterfeit drugs.

Many other anti-counterfeit measures have been developed for use with other products that been prime targets for counterfeiters such as checks, CDs and DVDs. These anti-counterfeit measures attempt to prevent a counterfeit manufacturer from easily reproducing labels that bear anti-counterfeit indicium. For example, companies such as Microsoft Corporation use holograms on the packages of their software to indicate authenticity. Escher Group of Cambridge, Mass. has developed a FiberFingerprint™ technology that can identify a piece of paper by its natural and unique fiber patterns. This enables the capability to identify a piece of paper in a way similar to identifying people through fingerprints. Tracer Technologies of Syosset, N.Y. has developed a fluorescent micro-fiber detection technology for security. The micro-fibers are randomly embedded in a plastic material which are only revealed upon illumination by UV light. AMCO of Farmingdale, N.Y. has developed visible as well as fluorescent tags that can be embedded in plastics. Other pigments that can be imbedded in an anti-counterfeit label or in a product have the capability of changing color when viewed at different angles. Such a color-changing pigment is also present in certain denominations of newly printed U.S. currency.

These anti-counterfeiting technologies make it difficult to reproduce the anti-counterfeit label component using copying or scanning techniques. However, more sophisticated counterfeiters have been known to make the investment necessary to duplicate these anti-counterfeit measures. For example, the holographic labels such as those used by Microsoft Corporation are known to have been successfully counterfeited.

While anti-counterfeiting technologies that involve special stimulus to be viewed, such as those disclosed in the parent '597 and '682 applications, provide an additional measure of security, if a scanner is not equipped with the appropriate hardware to provide the stimuli, the label may not be successfully decoded and the part may be improperly identified as counterfeit.

SUMMARY

Encoding a hardware compatibility flag in either an analog identification indicium or digital identification record of an authentication enabled label ensures that a compatible stimulus hardware is used to illuminate the analog identification indicium and that if a compatible stimulus is not available on the reader in use, indication of such can be given to the user and decoding may proceed without the analog component of the label.

A product is identified or authenticated by providing an analog identification indicium made up of a pattern of identification features. The visual appearance of the identification features is altered when stimulated by a compatible stimulus mechanism and the identification features correspond to an item identifier that can be determined when the identification features are stimulated by a compatible stimulus mechanism. A digital identification record is provided that includes an encoded digital version of the item identifier. At least one stimulus mechanism is provided as well as a hardware compatibility flag on the product that indicates a compatible stimulus mechanism that alters the identification features on the product such that the item identifier can be determined. The hardware compatibility flag is analyzed and it is determined if a compatible stimulus mechanism has been provided. If a compatible stimulus mechanism has been provided, the compatible stimulus mechanism is activated to read the pattern of identification features of the analog identification indicium and decode an item identifier. The digital identification record is read an item identifier is decoded. The authenticity of the product is determined by comparing the item identifier determined from the analog identification indicium to the item identifier determined from the digital identification record. If a compatible stimulus mechanism has not been provided, a user may be alerted that a compatible stimulus mechanism has not been provided by, for example, lighting an LED or by sounding an audible alert.

In some instances a compatible stimulus mechanism is ultraviolet light having a wavelength falling within a specific range. In other instances a compatible stimulus is visible light. The hardware compatibility flag can be either a part of the digital identification record or of the analog identification indicium. When the hardware compatibility flag is a part of the analog identification indicium, it may take the form of a finder pattern that forms a border around the analog identification indicium that includes at least one attribute that indicates a compatible stimulus. The appearance of the border may is also altered by a compatible stimulus mechanism.

These and other objects, advantages, and features of the exemplary embodiment of the invention are described in detail in conjunction with the accompanying drawings.

DETAILED DESCRIPTION

Figure 1:
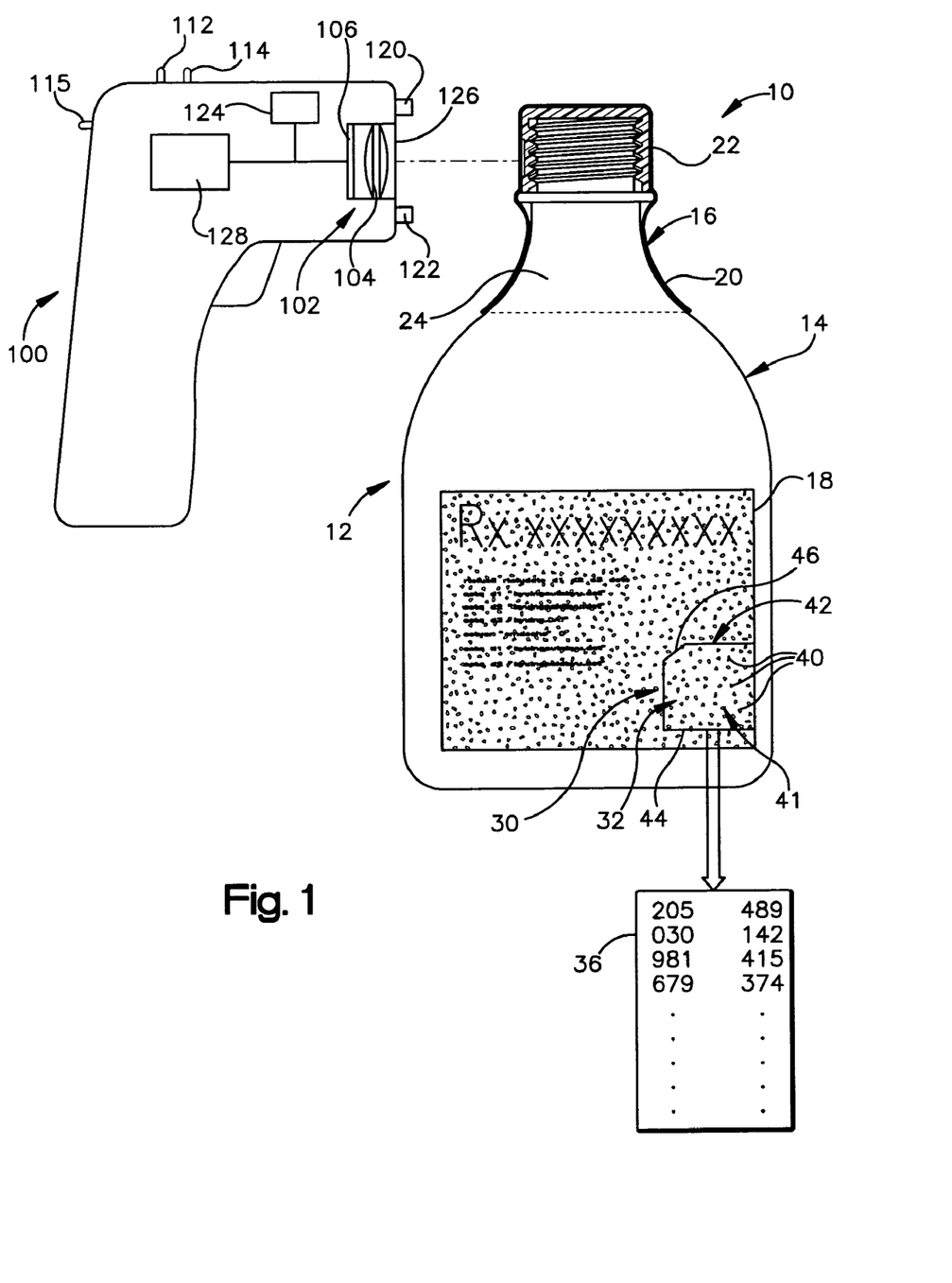
FIG. 1 is a schematic representation of a product authentication/identification system including a reader capable of imaging and decoding both analog and digital identification indicia and a product including an analog identification indicium embedded in a container label of the product and a digital identification indicium included in a 2D bar code imprinted on a tamper-resistant seal of the product.
Figure 2:
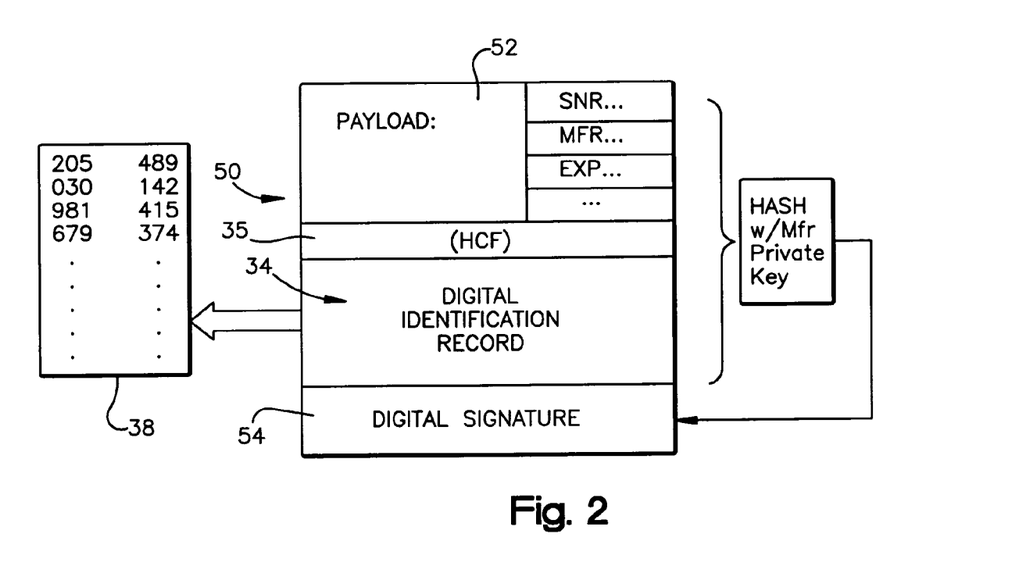
FIG. 2 is a schematic illustration of information encoded in the 2D bar code of FIG. 1 including the digital identification indicium.

One preferred embodiment of the identification or authentication system of the present invention is shown generally at 10 in FIGS. 1 and 2. The system 10 provides a straightforward way of authenticating a product 12 using a two component authentication identifier 30, the two components being attached to separable parts of the product 12. The system also includes a reader device 100 adapted to read and decode both components of the authentication identifier 30.

Figure 1A:
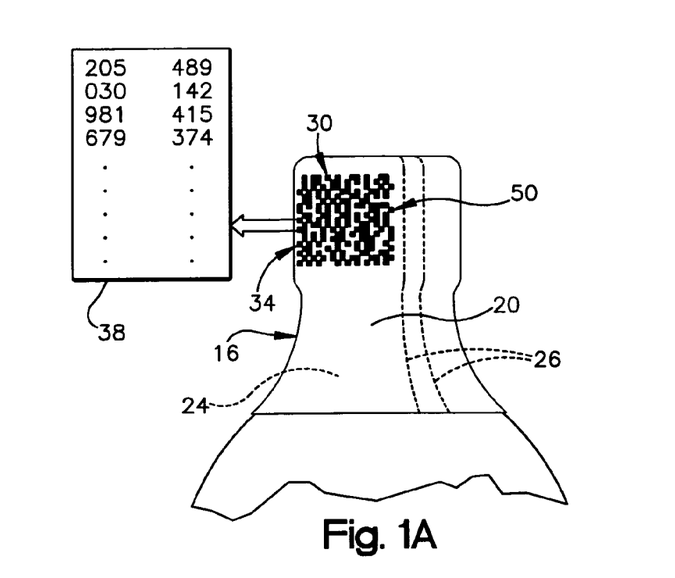
FIG. 1A is a schematic elevation view of the wrapped seal of FIG. 1.

The product 12 includes a container 14 that holds, for example, prescription medication in the form of tablets, capsules or liquid. The product container 14 includes a tamper-resistant seal 16 and a product label 18. As shown in FIGS. 1 and 1A, the seal 16 may be a plastic wrap 20 that tightly overlies a cap or top 22 of the container 14 and a shoulder portion 24 of the container below the cap 22. Typically, the seal wrap 20 includes one or more vertical lines of weakness 26 that allow a consumer to more easily remove the wrap 20 from container 14.

The product 12 includes the authentication identifier 30 which has two components: an analog identification indicium 32 and a digital identifier or indicium such as a digital identifier record 34. The analog identification indicium 32 and the digital identification record 34 (FIG. 1A) are applied or affixed to separable parts of the product 12. The analog identification indicium 32 is embodied in a random pattern 41 of identification features 40 within an area of interest 42.

The digital identification record 34 is embodied in a digital pattern of a portion of a 2D bar code 50. The analog identification indicium 32, when decoded, generates an item identifier 36. Similarly, the digital identification record 34, when decoded, generates an item identifier 38. The "(HCF)" 35 that is shown as part of the 2D bar code 50 is an optional digital identification record hardware compatibility flag which will be discussed in detail below.

If a comparison of the patterns comprising the item identifiers 36, 38 indicates that they match, that is, they are similar within predetermine tolerances, the product 12 is deemed authentic. During manufacture of the product 12, the item identifier 36 generated from the analog identification indicium 32 is used to encode the digital identification record 34, therefore, the item identifiers 36, 38 should be identical. However, when subsequently authenticating the product 12 in the field, the reading and decoding of the analog identification indicium 32 is prone to error because many variables that may affect the quality of the imaging and, thus, the decoded item identifier 36 may be slightly influenced by the angle and distance of the reader device 100 from the pattern 41, the illumination level, contaminants on or damage of the area of interest 42 of the product 12, etc. On the other hand, because of error-correction techniques generally built into the 2D bar code 50, the reader device 100 generally can accurately decode the bar code 50. Thus, even if the product 12 is authentic, the item identifiers 36, 38 are unlikely to match exactly. Rather, the geometrical patterns represented by the item identifiers 36, 38 are compared and if they are within predetermined tolerance limits, the product 12 is deemed authentic.

More specifically, the analog identification indicium 32, when decoded, corresponds to or generates a sequence of numerical values referred to as the item identifier or signature 36. The numerical values of the item identifier 36 may, for example, correspond to Cartesian (x & y) coordinates of some or all of the identification features 40 within the area of interest 42 and/or reflected or emitted light intensity values of some or all of the imaged features 40 and/or color values of some or all of the imaged features 40 and/or other attributes of the random pattern 41. The sequence of numbers corresponding to the item identifier 36 of the analog identification indicium 32 is encoded into the digital identification record 34 of the product 12.

Advantageously, the two components of the authentication identifiers 30 are disposed on separable parts of the product 12. For example, the analog identification indicium 32 may be incorporated into the product label 18, while the digital identification record 34 may be incorporated into the tamper-resistant seal wrap 20. In this way, when the product 12 is opened for use by a purchaser, the components 32, 34 of the authentication identifier 30 are separated thereby removing the connection between the components and preventing their reuse.

Further, upon first opening of the product container 14, the digital identification record 34 incorporated in the seal wrap 20 is destroyed, preventing, for example, refilling the container 14 with counterfeit tablets, capsules or liquid and reselling the product 12.

The identification and authentication system 10 further includes the reader device 100, such as an imaging-based bar code reader or scanner capable of reading and decoding both the analog identification indicium 32 and the digital identification indicium 34. Generally, imaging-based bar code readers or scanners include an imaging system 102 that utilizes an imaging array such as a CCD array or a CMOS array having a plurality of photosensitive elements or pixels.

Light reflected or emitted from a target image, e.g., a target bar code imprinted on a product label or product packaging within a field of view of the imaging system 102, is focused through a lens 104 of the imaging system onto a pixel array 106. Output signals from the pixels of the pixel array are digitized by an analog-to-digital converter 108. Decoding circuitry 110 of the device 100 processes the digitized signals and attempts to decode the imaged target, e.g., the imaged target bar code. While the shapes and relative sizes of the analog and digital identification identifiers 32, 34 are arbitrary, it is advantageous to select relative sizes that may be successfully imaged by the optics of the same reader 100 without the need for changing magnification or zooming.

One method of determining product authenticity is to use reader device 100 to read and decode the analog identification indicium 32 and the digital identification record 34. If the two identification identifiers 32, 34 generate the same or substantially the same item identifiers 36, 38, the product 12 is determined to be authentic and a positive audio and/or visual feedback may be provided to the operator of the reader 100, e.g., illumination of a pair of green LEDs 112, 114 and/or an audible "beep" from a speaker 113 to indicate an authentic product. As noted above, because of the variability inherent in imaging in the field as well as contaminants and damage to the product 12 (e.g., scratches on the product label 18 and/or seal 20), it is likely that the pattern of numbers representing the item identifiers 36, 38 will not match exactly. For example, when imaging the random pattern 41 comprising the analog identification indicium 32, one or more of the identification features 40 is "missed," that is, not successfully imaged and decoded, the resulting pattern of numbers representing the item identifier 36 will necessarily be different than the pattern of numbers representing the item identifier 38 decoded from the 2D bar code 50.

Depending on the nature of the product and the desired level of security, a substantial matching, that is, some predetermined level of matching less than 100% matching of the compared patterns comprising the item identifiers 36, 38 will be deemed sufficient to determine the product 12 is authentic.

This method of authentication has the advantage of being a "stand alone" method of authentication that can be performed in the field without the necessity of communicating with a remote database. If desired, however, information from the authentication process may be communicated to a central database to permit tracing and tracking of the product 12 through its distribution system from manufacturer to consumer. The transmission of information regarding the product 12 to a central database may also include a product serial number (encoded in a payload 52 of the 2D bar code 50), the time and place that the authentication occurred, an identification number of the reader device 100, an identification number of the user/company authorized to use the reader device 100.

Analog Identification Indicium 32

Embedded in the label 18 is the analog identification indicium 32 comprising the random identification pattern 41. The pattern 41 includes a plurality of spaced apart identification features 40 within the area or region of interest 42 of the label 18. To facilitate reading the region of interest 42, the region of interest 42 may be marked with an identification mark in the form of a border or outline 44, visible under normal ambient light, to define the region of interest 42 (FIG. 1A). Right angled portions of the border or outline 44 may advantageously be used as the coordinate axes for calculating the x & y coordinates of the features 40, the x & y coordinate values being part of the item identifier 36.

The identification features 40 preferably are embedded in the material that the label 18 is fabricated from. The features 40, for example, may be one or more types of colored particles distributed in a random pattern. Some or all of the colored particles may be color-shifting particles such that the particles respond in a predictable way under illumination of a given wavelength, for example, the features 40 may be color-shifting such that they are visible in the presence of UV or infrared light, but nearly invisible when illuminated with visible light. One color-shifting characteristic that can be used is fluorescence, which generally refers to the excitation of visible light by means of invisible illumination.

The use of color-shifting features prevents the use of photocopiers or scanners to reproduce the label 18. The use of colored features 40 advantageously allows batches of label material to be produced in a normal process of making certain film or paper-like materials wherein the features would be randomly mixed in and survive intact throughout the remaining process. One benefit of using color-shifting material is that the influence of post-production disfigurations and contaminations (such as pieces of dirt or dust), which are not normally color-shifting themselves, is reduced. Such disfigurations can be detected by comparing an image taken with UV or infrared light to one taken with visible light.

The analog identification features 40 are demarcated by the outline 44 such that, while the colored particles may be located throughout the label 28, only the demarcated area or region of interest 42 is processed by reader 100 to read the analog identification indicium 32. Alternatively, the identification pattern 41 may be printed on the label material using a conventional printing process provided that the features 40 are random and, therefore, would change from label to label such that each analog identification indicium 32 would generate a unique product identifier 36.

The analog identification indicium 32 preferably includes an orientation feature 46 to indicate to the reader 100 how the analog identification features 40 should be parsed in order to match the reading orientation used for generating the digital identification record 34 and to successfully read and decode the analog identification indicium 32. Alternately, the analog identification indicium 32 may be of a type that does not require an orientation feature for successful reading and decoding. An example of such an analog identification indicium comprising a random pattern of identification features in the form of particles imbedded in a tamper-resistant seal or cap of a container is disclosed in U.S. application Ser. No. 10/974,644, filed on Oct. 27, 2004 and entitled "Method of Identifying and Authenticating Products Using an Identification Pattern and Bar Code Reader." The '644 application is assigned to the assignee of the present invention and is incorporated herein in its entirety by reference.

Any other randomly generated pattern that is difficult to reproduce using conventional methods may be used as the analog identification indicium 32. The random pattern of features 40 can be generated such that the features produce a unique identifier or signature for each indicium that would rarely, if ever, be reproduced in a like indicium. The randomness increases the likelihood of detection of strictly duplicated analog identification features. The randomness can be derived from a variety of factors, such as the location, size, or color of the features and if the features are long, such as fibers, the orientation of the fibers as well can be used to derive randomness.

The indicia reader 100 reads the analog identification indicium 32 and using a mathematical algorithm and/or decision rules determines the item identifier 36, that is, a numerical representation of some quality of the analog identification feature. For example, the identifier 36 may be a collection of data describing the identifiable features in the analog identification feature, such as the x-y coordinates of all or a predetermined number of features 40.

Digital Identification Record 34

In the manufacturing of the product label 18, a unique analog identification indicium 32 in the form of a random identification pattern 41 in a region of interest 42 is generated as described above. The analog identification indicium 32, when decoded by the reader 100, generates or is transformed into the unique item identifier 36. During the manufacturing process, the item identifier 36 is then encoded to generate the digital identification record 34 which is attached to or imprinted on the product 12 for subsequent authentication. The digital identification record 34 preferably is encoded in a portion of the 2D bar code 50, such as a DataMatrix bar code.

The item identifier 36 may also be stored in a memory 124 of the reader 100. The reader memory 124 may include a file of authentic item identifiers. A record of recently read signatures, or their representations, such as hashes, may be advantageously stored for comparison to the signature currently being processed to detect duplication of a random pattern among labels in the same batch of product.

FIG. 2 is a schematic representation of the 2D bar code 50. The bar code 50 is digital, that is, the presence or absence of a dark area or cell is representative of a zero or one. The bar code 50 includes three encoded fields or parts: the payload 52, the digital identification record 34 which includes the encoded item identifier 38, and a digital signature 54. The data encoded in the bar code 50 is generally not encrypted, but advantageously uses error-correction to protect the reading integrity of the information it carries. Identifiers usually identify each individual field or groups of fields according to given industrial standards.

The payload 52 encodes the manufacturer's identifying and specifying information and typically includes some or all of the following information: UPC/EAN number, manufacturer, part number, lot number, serial number, and expiration date. This portion of the bar code 50 can be read and processed by standard bar code scanners or readers in those situations where authentication is deemed unnecessary.

The digital identification record 34 is tagged with an identifier similar to those used for the payload information. Encoding the digital signature 54 in the bar code 50 utilizes a technology that is widely available in e-commerce and in almost every web browser. The National Institute of Standards and Technology (www.nist.gov) maintains a standard version, which is available at no cost. As shown in FIG. 2, the digital signature is a one-way hash of the message to which the signature is attached. In this case, the message is the information from the previous two subsections (payload 52 and digital identification record 34). The field identifiers themselves could be included as part of the message. The presence of the digital signature 54 vouches for the authenticity of the information that is used to create the signature. The signer possesses a unique number for generating the one-way hash, which is generally referred to as the secret or private key. A published related number, that is, a public key is used to verify that the digital signature 54 matches the message.

Indicia Reader 100

The indicia reader shown in FIG. 1 is a hand-held imaging-based scanner or reader. However the invention can be applied to stationary readers and laser scanners as well. Utilizing its imaging system 102 and bar code decoding circuitry 110, the reader 100 may be used both to image and decode the 2D bar code 50 imprinted on a label 18 to obtain certain information and for inventory control purposes and to authenticate the product 12 by imaging and decoding the analog identification indicium 32 and comparing the item identifier 36 derived from the indicium 32 with the item identifier 38 embedded in the digital identification record 34 of the 2D bar code 50. The reader 100 images the 2D bar code 50 and decodes the digital identification record 34 to obtain the item identifier 38.

For the decoding of the analog identification pattern 41, the reader 100 includes additional pattern decoding circuitry 116, embodied either in software or hardware, such that when the label 18 area of interest 42 is imaged by the reader 100, the pattern decoding circuitry 116 analyzes the captured image, locates and identifies the analog identification indicium 32 by the shape of its outline 44, identifies the region of interest 42 and the identification features or particles 40 within it, ascertains the identification pattern 41 and determines the item identifier 36 for the product 12. The item identifiers 36, 38 are compared by comparison circuitry 118 of the reader 100 to decide if the identifiers 36, 38 are similar enough to conclude the product 12 is authentic.

Since it is desired that the reader 100 be able to image and decode both an identification pattern 41 that includes particles 40 that color shift under UV illumination and a 2D bar code 50, it is necessary that the reader provide both visible illumination and illumination in the ultraviolet (UV) range. Additional opto-electrical components may also be desired to form an aiming pattern corresponding to a field of view of the imaging assembly 102. The visible illumination is preferably provided in the form of an array of visible LEDs 120 and the UV illumination is preferably provided in the form of an array of UV LEDs and/or one or more UV lasers 122. Providing a UV laser 122 instead of or in addition to UV LEDs increases the intensity of the excitation UV light directed at the fluorescent particles 40. This, in turn, causes the emitted fluorescent light to be of greater intensity and, therefore, more likely to produce a decodable image.

Figure 3:
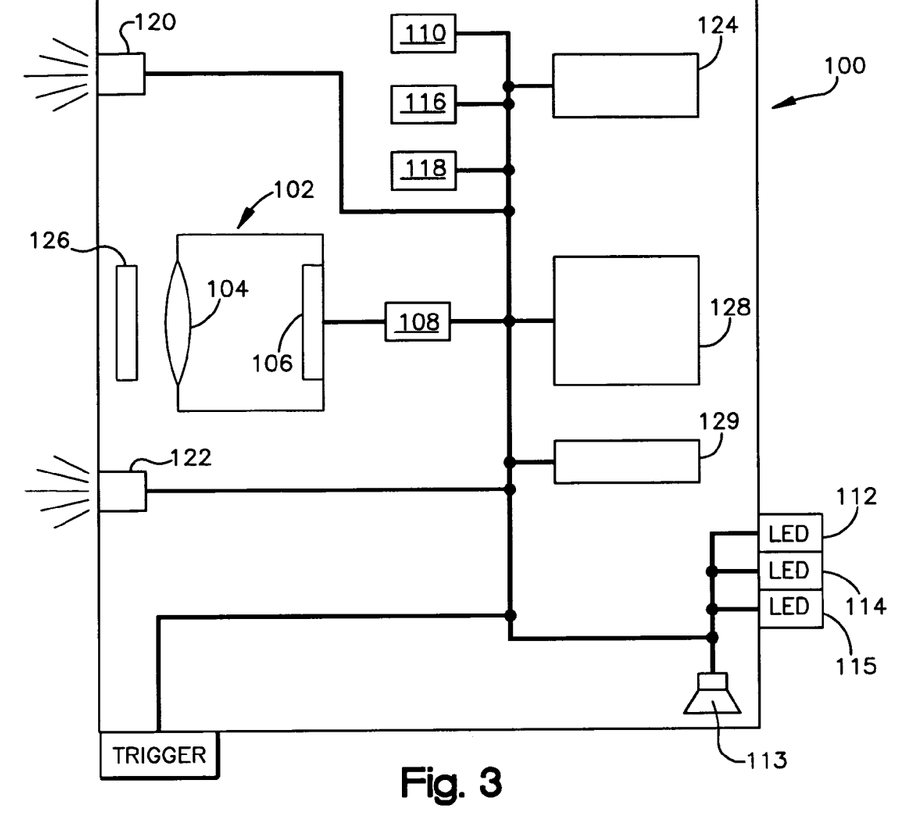
FIG. 3 is a schematic illustration of a reader capable of imaging and decoding both analog and digital identification indicia.

If the analog identification feature includes color-shifting fibers, a specialized imaging system 102 such as that shown in FIG. 3 is required to detect the color-shifting fibers. The imaging system 102 includes the lens 104 and the sensor 106 (such as a CCD or CMOS 2-D array sensor), a narrow band block filter 126 that is in the reflected light path of the lens 104, positioned either in front of or behind the lens, one or more visible LEDs 120, one or more UV LEDs and/or UV laser 122, a micro-processor 128, the on board memory 124, which may contain a database of public keys, and interface and support circuits 129. The interface and support circuits 129 may have wired and/or wireless communications means to a host computer or a network. It may also contain an onboard battery (not shown), and/or connections for an external power supply (not shown).

The narrow band block filter 126 has a pass band that is chosen to match that of the fluorescent light emitted by the identification features 40. In addition, it also matches that of the visible LEDs 120. This is possible because there are different fluorescent materials that fluorescence in different wavelengths. And likewise, there are different LEDs that emit light in different wavelengths. By choosing a suitable fluorescent material and a type of LED that have common wavelengths, the filter 126 can be constructed with a pass band that can allow both the light of the LEDs 120 and the fluorescence of the features 40 to pass through. Having a narrow band filter has the advantage that it can block out the majority of ambient light. Because the emitted fluorescent light is often weak, ambient light, if not blocked, could easily overwhelm the fluorescent light. Alternatively, the reader 100 could be constructed to work in contact mode, that is, a forwardly facing outer bezel of the imaging system 102 is positioned so as to touch the product 12 in order to read the identification pattern 41 or the 2D bar code 50. In the contact mode, the reader body functions to block out ambient light.

Figure 4:
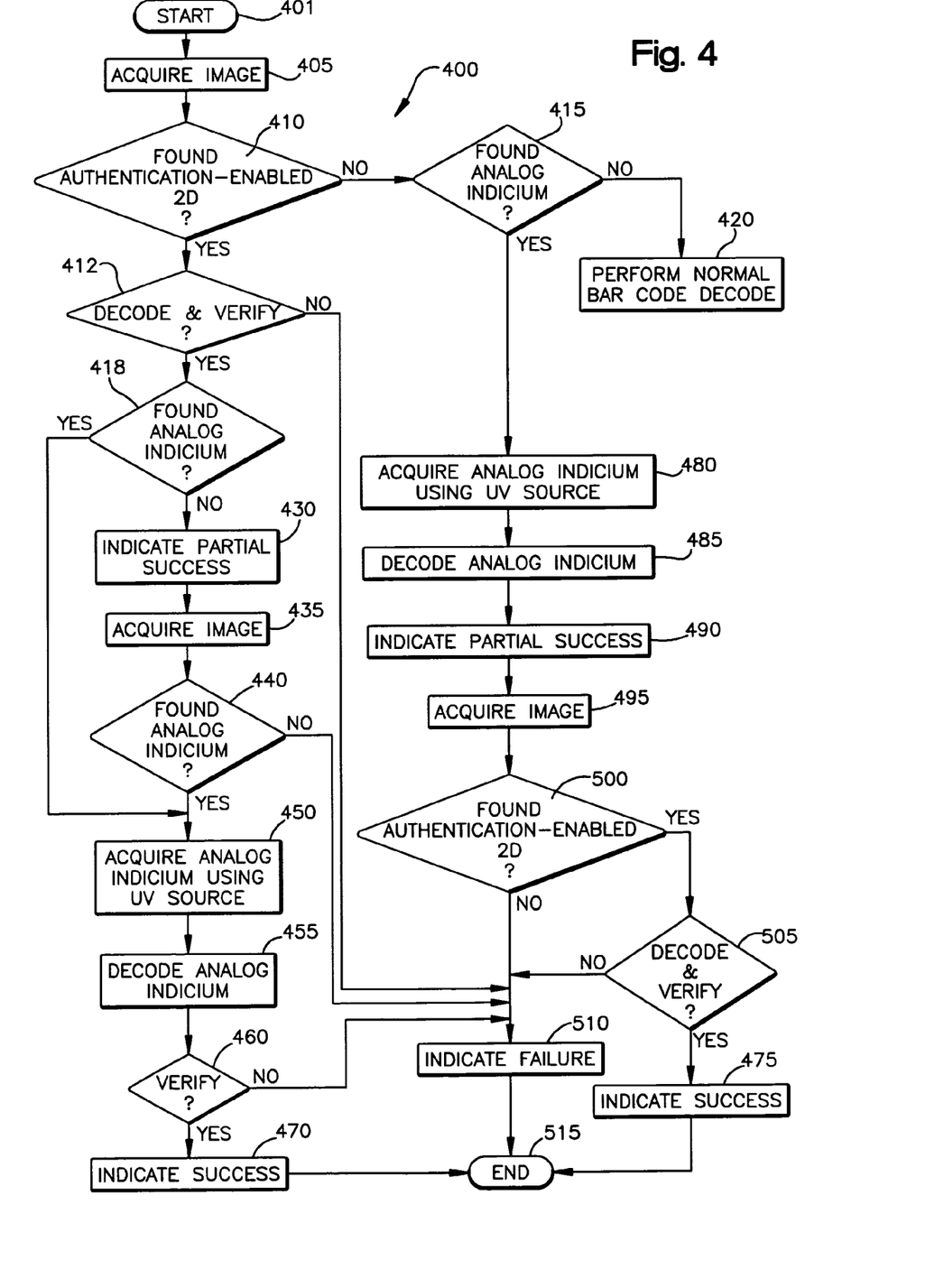
FIG. 4 is a flow chart of a method used by the reader to process analog and digital identification indicia to authenticate the product of FIG. 1.

To process the authentication-enabled analog and digital identifiers 32, 34, the device 100 includes decoding and comparison software 110, 116, 118 that follows the method 400 outlined in FIG. 4. The device 100 can operate in one of several modes, allowing for varied degree of functionality depending on the capabilities of the reader 100 and its level of connectivity. The level of connectivity may be batch, where the device 100 works without a connection to a PC and either performs only the authentication task and provides audio/visual feedback for success or failure, or stores the decoded bar code results in its on-board memory 124 for downloading at a later time. Alternately, the device 100 may be connected to a computer or a wide-area-network. In this way, the decoded results can be instantly transferred, for example, for processing on a linked computer and used for tracking and tracing applications, that is, tracking and tracing the product 12 through its distribution system.

Method of Authentication

Referring now to FIG. 4, a method of authentication is shown generally at 400. At step 405, upon actuation of the reader 100, an image is acquired of the product 12 using the visible illumination source 120. At step 410, the acquired image is analyzed to determine if the authentication-enabled 2D bar code 50 is in the captured image. An authentication-enabled bar code is one that includes a field including the digital identification record 34 and a field including the digital signature 54. If not, the image is analyzed at step 415 to check for the presence of the analog identification indicium 32 indicated by the outline 44.

If neither an authentication enabled bar code 50 nor the analog identification indicium 32 is detected, but the image does include a standard bar code, the image is decoded in the standard fashion at step 420. This branch of the software allows the device 100 to process a regular bar code that is not authentication-enabled.

If the analog identification indicium 32 is found in the image at step 415, the analog identification indicium 32 is acquired again in step 480. The step of reacquisition as indicated in step 480, is needed if the imaging of the identification features 40 of the analog identification indicium 32 requires specialized light, such as UV. The analog identification pattern 41 within the outline 44 is processed in step 485 to decode the product identifier 36. The transformation from identification pattern features 40 to the item identifier 36 is based on one or more attributes or qualities of the features 41, e.g., location of features, size of features, color of features, etc. Predetermined transformation rules are followed to decode or convert the imaged identification pattern 41 to the item identifier 36.

A partial success in decoding the analog identification indicium 32 is indicated at step 490 by, for example, illuminating one but not both of the two authentication green LEDs 112, 114 and/or the sounding of a designated partial decode audio signal through a speaker 113, while the item identifier 36 is stored in the device's memory 124. After the indication of partial success in step 490, signifying the success acquisition of the item identifier 36 from the analog identification indicium 32, the reader 100, upon user activation, acquires another image in step 495.

In step 500, the device 100 attempts to find the 2D bar code 50 in the captured image. If it is not found as expected, it indicates a failure mode in step 510, for example by energizing a red LED 115 and/or the sounding of a designated failure audio signal through the speaker 113, and ends the session at step 515. If the device 100 does find the 2D bar code 50 in the captured image, at step 505, the device decoding software 110 decodes the digital identification record 34 and the digital signature 54 to determine the item identifier 38. The digital signature 54 is decoded to verify the authenticity of the digital identification record 34. The comparison software 118 then compares the two item identifiers 36, 38 to verify the authenticity of the product 12.

If the comparison at step 505 succeeds, that is, the item identifiers 36, 38 are substantially identical, the product 12 is deemed authentic and, at step 475, success is indicated to the operator via illuminating both LEDs 112, 114 and/or the sounding of a designated success audio signal through the speaker 113, and the process ends at step 515. On the other hand, if the comparison at step 505 fails, that is, the item identifiers 36, 38 are not substantially the same, failure is indicated in step 510 by illuminating red LED 115 and/or the sounding of a designated partial decode audio signal through the speaker 113 and the process ends at step 515.

If the authentication enabled 2D bar code 50 is found in the captured image at step 410, then at step 412, the device decoding software 110 decodes the digital identification record 34 to generate the item identifier 38. The digital signature 54 is also decoded and is used to authenticate the digital identification record 34. If the digital identification record 34 cannot be both decoded and verified, then failure is indicated in step 510 (via red LED 115 and/or audio tone) and the process ends at step 515.

If the digital identification record 34 is verified and decoded to generate the item identifier 38, then at step 418, the software searches for the outline 44 of the analog identification indicium 32 in the image. If the identification mark of the analog identification indicium 32 is not found, a partial success is indicated in step 430 (by illuminating one of the two green LEDs 112, 114 and/or sounding an audio tone) to signify the successful acquisition of the item identifier 38. Upon user activation of the device 100, another image is acquired in step 435. In step 440, the new image is searched for the outline 44 of the analog identification indicium 32. If this step fails, failure is indicated at step 510 (illuminate red LED 115) and the session ends at step 515.

If the analog identification outline 44 is found at step 440, control passes to step 450. If the analog identification outline 44 is found at step 418, then again control is passed to step 450. At step 450, an image containing the analog identification indicium 32 is acquired using the UV light source 122. The analog identification pattern 41 is decoded and the item identifier 36 is calculated in step 455. In step 460, the two item identifiers 36, 38 are compared by the comparison software 118 to verify the authenticity of the product 12.

If the verification based on the comparison of the two item identifiers 36, 38 fails, failure is indicated in 510 by illuminating the red LED 115 and/or sounding an audio tone for failure, and session ends at step 515. However, if the verification succeeds, success is indicated in 470 by illuminating both green LEDs 112, 114 and/or sounding an audio tone for successful authentication, and session again ends at step 515.

Those in the art can easily embellish FIG. 4 in accordance to industry standard practices regarding bar code readers. For example, from each user activation step to the point where the reader determines that a code has not been properly acquired in the image in memory, one or more images could be acquired and decode attempted before a failure is declared. On the other hand, if one of these images is decoded successfully, the session (or half-session) is declared successful (or partially successful).

In steps 460 and 505, the item identifiers 34, 36 are verified with a user selectable degree of tolerance or error. The predetermined tolerance or error level may include values for both the number of features found and for their specific values. For example, if the item identifiers 34, 36 represent the x-y coordinates of 25 features in the identification pattern 41, a level of tolerance may be set such that at least 23 of the 25 features need to be identified when imaging the pattern 41. This would account for dust or other contaminants covering or a scratch obliterating a particular feature. Further, with regard to the features identified, a level of tolerance may be set such that the coordinate values must be within +/−10% to be considered a match. For example, if the item identifier 38 included an x-y coordinate value of (205, 489), if the item identifier 36 included a coordinate value of (193, 510) would be considered a match since each of the x and y values are within +/−10%.

The digital identification record 34 is verified in 505 and 412 using the digital signature 54 and the manufacturer's public key. This key should be made available by the manufacturer. The key is usually obtained or verifiable through a trusted certificate agent. The key can be stored in the reader's memory 124 (FIG. 3) or on an associated computer that is accessed by wireless or hard-wired connection. Most readers have sufficient on board memory to cache a number of public keys.

Digital signatures are generally fixed for each manufacturer, with occasional changes in the event that it is retired due to special circumstances such as a merger or breach of security. It is thus generally safe to cache the key for a limited period of time. An expiration time is generally specified with the key, such as one year form the time of issuance or renewal.

The digital signature can be verified alone, without the reading of the analog identification indicium 32. This approach allows a degree of authentication to be provided without requiring hardware modifications for activating specialized features in the analog identification feature.

Alternative embodiments of the security device include using other digital media to record the same information that is recorded in the 2D bar code 50. For example, a magnetic device, or solid-state memory device (such as a memory button or a radio-frequency ID tag (RFID)) could be used.

Hardware Compatibility Flag

The identification features 40 described above often require specialized hardware, such as UV LED/laser 122 (FIG. 1) to stimulate or make visible the feature for analysis and matching with the digitally encoded item identifier 38. The appearance of the identification features 40 may be significantly altered when they are exposed to proper type of light. Applications requiring authentication are widespread and it is possible that users prefer the use of certain identification feature stimuli. For example, some users may prefer that the authentication identifier 30 is only visible under a specific wavelength of UV light while other users may prefer that the authentication identifier 30 be visible in visible light.

A bar code scanner may only have one special stimulus source as part of its hardware. Alternatively, a bar code scanner may have more than one, but less than the complete gamut of, stimulus sources available. If a bar code scanner is used to attempt to read a label with identification features 40 requiring different stimulus hardware than present in the scanner, authentication of the label will fail and the reason for the failure will be unknown. It is preferable for a bar code scanner to be able to recognize a family of authentication identifiers 30, even though it cannot fully authenticate some of them, and alert a user when the proper stimulus hardware is not available.

As discussed above, each authentication identifier 30 includes a border or finder pattern 44. If the finder pattern 44 is printed such that the finder pattern is invisible in visible light, it may make it more difficult for a user to direct the scanner toward the proper area of the label to process an authentication identifier 30.

Figure 5A:
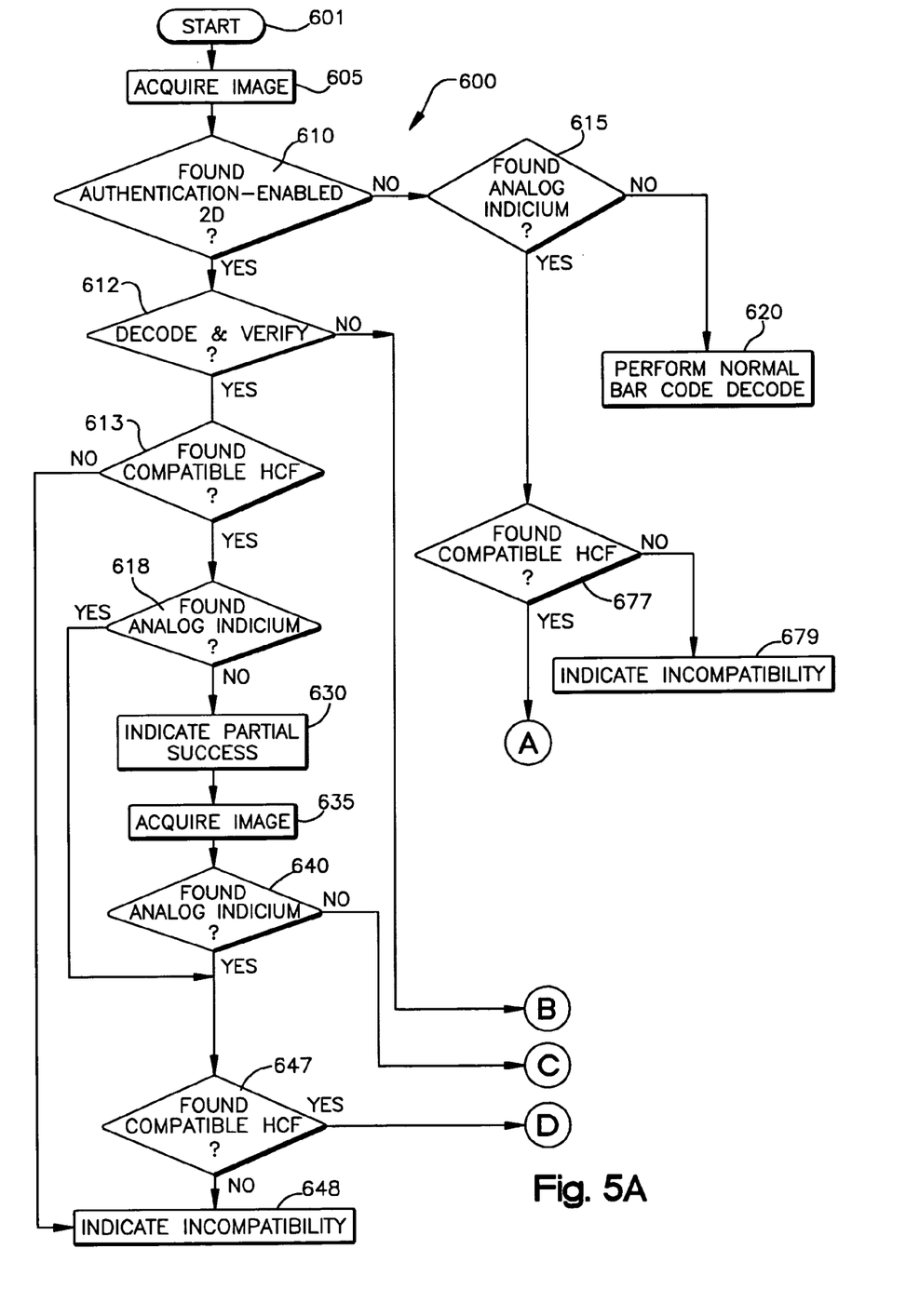
FIG. 5 is a flow chart of a method used by the reader to process analog or digital identification indicia that include a hardware compatibility flag in accordance with an embodiment of the present invention.
Figure 5B:
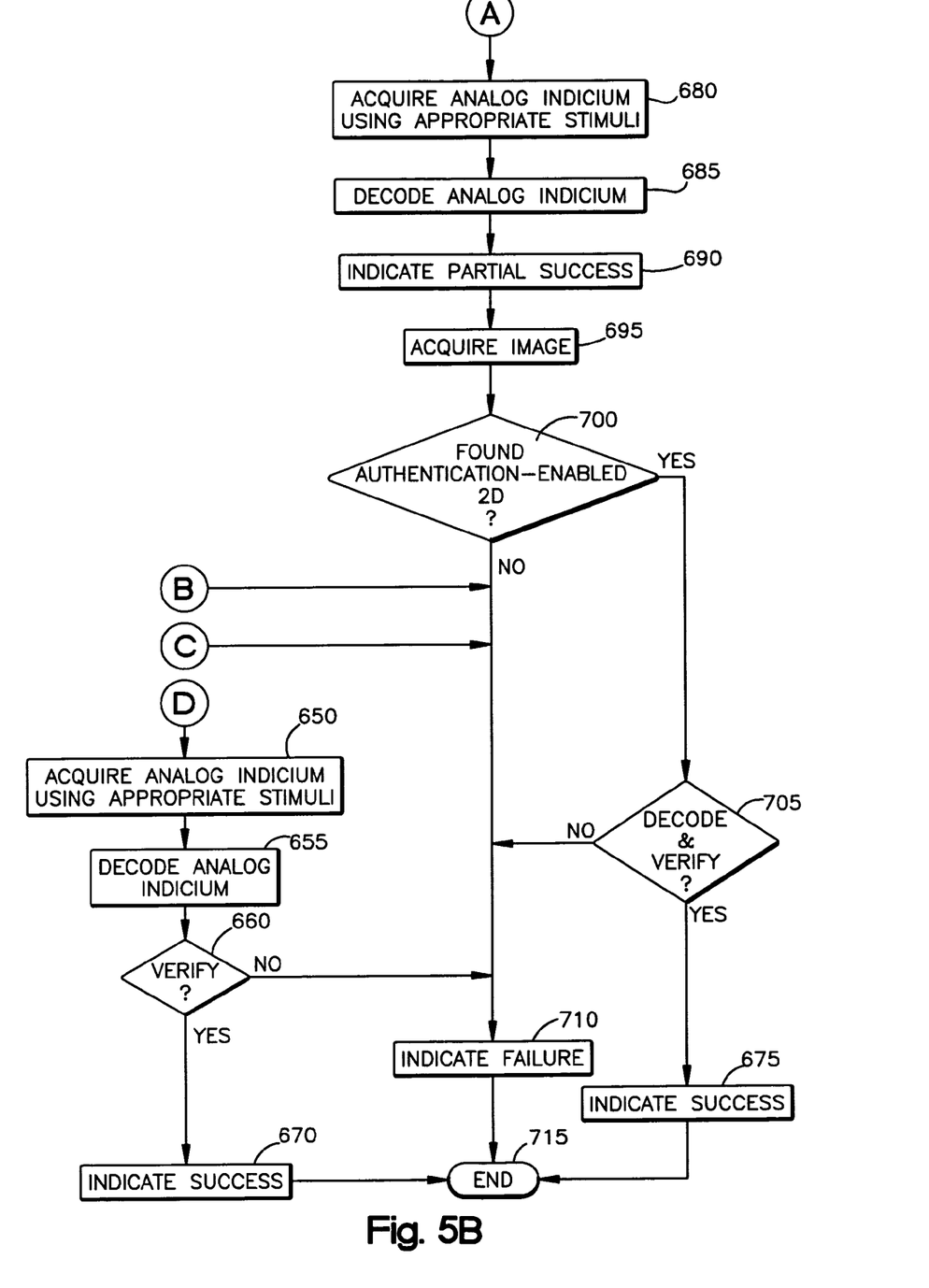
Figure 6A:
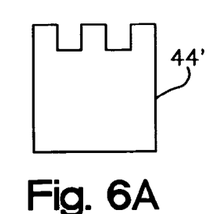
FIGS. 6A-6D show analog indicium outline patterns that can be used to implement hardware compatibility flags in accordance with an embodiment of the present invention.
Figure 6B:
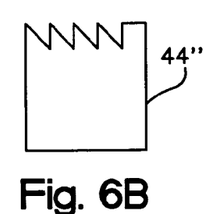
Figure 6C:
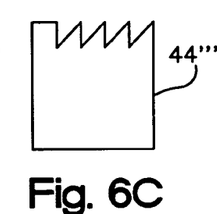
Figure 6D:
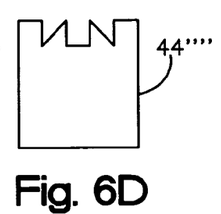

FIGS. 5 and 6 illustrate the use of a hardware compatibility flag that can be part of either the authentication identifier 30 or the digitally encoded item identifier 38. FIGS. 6A-6D illustrate four different finder patterns 44'-44'''' that incorporate a hardware compatibility flag as part of the top (or other) border of the finder pattern. The common features of this family of finder patterns is that they include the same size and overall shape, and the fact that they are all made with connected straight-line segments. Such a family of finder patterns can easily be found by software designed to find their commonalties, and can also distinguish between these different versions. Each particular finder pattern could identify a different wavelength of light that must be used to illuminate the identification features 40 located within the finder pattern. The finder pattern is visible in broad-spectrum visible light, so even though the features encoded may not be detectable when an incompatible scanner is used to scan the authentication identifier 30, the scanner can now recognize this incompatibility.

The finder pattern 44 may be printed in two or more types of ink, one that is visible in visible light and others that are visible in UV light. In this way, the finder pattern can be detected under both the normal light source and the alternative specialized source. The two types of ink may present different optical characteristics to the camera as well. For example, the ink that is visible under visible light may be light absorbing, thus presenting the finder pattern 44 as features darker than the background, while the ink that is visible under UV illumination may be fluorescent, such that the finder pattern 44 is observed as brighter features than the background.

An alternative to providing a hardware compatibility flag that is part of the authentication identifier 30 is to encode the hardware compatibility flag into the digitally encoded item identifier 38. One such embodiment is shown in FIG. 2, where the hardware compatibility flag 35 is part of the 2 dimensional bar code 50. It is also possible that both means of encoding the hardware compatibility flag can be used on the same label, thereby enabling the scanner to detect hardware incompatibility when either part of the authentication mark is read.

Referring now to FIG. 5, a flow chart outlines a method 600 of processing a label that includes a bar code with an authentication enabled scanner. The method 600 follows the method 400 that was already discussed in detail in conjunction with FIG. 4, so only differences between the two will be summarized here. The authentication enabled scanner acquires the target image and whenever it is determined that an analog authentication indicium is present (615, 618), the hardware compatibility flag (HCF) is checked at 677 and 647. As discussed above, when it is part of the analog indicium, the hardware compatibility flag can be a specialized finder pattern such as that shown in FIGS. 6A-6D. If at 647 and 677 it is determined that the proper hardware is present to provide the stimuli indicated by the hardware compatibility flag, the normal process is followed as discussed relating to FIG. 4. If the hardware is not present, then at 648 and 679, the user is alerted that the hardware is not compatible and the decode session ends. In the case where the hardware compatibility flag is part of the 2D bar code as shown in FIG. 2, the hardware compatibility flag is analyzed at 613 and if it is determined that the proper hardware is present, the normal process is followed as discussed in FIG. 4. If the hardware is not present, then at 648, the user is alerted that the hardware is not compatible and the decode session ends. In this way, the user is made aware of the hardware issue and any goods that cannot be authenticated are not processed.

It can be seen from the foregoing description that including a hardware compatibility flag as part of an authentication enabled label ensures that the proper stimulus is used to read the analog indicium or that the operator is alerted if the proper stimulus hardware is not available. Although the invention has been described with a certain degree of particularity, it should be understood that various changes can be made by those skilled in the art without departing from the spirit or scope of the invention as hereinafter claimed.

I claim:

1. A method of identifying or authenticating a product comprising:
   providing an analog identification indicium comprising a pattern of identification features, wherein the visual appearance of the identification features is altered when stimulated by a compatible stimulus mechanism, the identification features corresponding to an item identifier that can be determined when the identification features are stimulated by a compatible stimulus mechanism;
   providing a digital identification record including an encoded digital version of the item identifier;
   providing at least one stimulus mechanism;
   providing a hardware compatibility flag on the product that indicates at least one compatible stimulus mechanism that alters the identification features on the product such that the item identifier can be determined;
   analyzing the hardware compatibility flag and determining if a compatible stimulus mechanism has been provided;
   if a compatible stimulus mechanism has been provided, activating the compatible stimulus mechanism to read the pattern of identification features of the analog identification indicium and decode an item identifier;
   reading the digital identification record and decoding an item identifier; and
   determining authenticity of the product by comparing the item identifier determined from the analog identification indicium to the item identifier determined from the digital identification record.

2. The method of claim 1 wherein if a compatible stimulus mechanism has not been provided, the method further includes alerting a user that a compatible stimulus mechanism has not been provided.

3. The method of claim 2 wherein the user is alerted by lighting a LED.

4. The method of claim 2 wherein the user is alerted by sounding an audible alert.

5. The method of claim 1 wherein a compatible stimulus mechanism is ultraviolet light having a wavelength falling within a specific range.

6. The method of claim 1 wherein a compatible stimulus is visible light.

7. The method of claim 1 wherein the hardware compatibility flag is part of the digital identification record.

8. The method of claim 1 wherein the hardware compatibility flag is part of the analog identification indicium.

9. The method of claim 8 wherein the hardware compatibility flag is indicated by a finder pattern of the of the analog identification indicium.

10. The method of claim 9 wherein the finder pattern includes at least one attribute that indicates a given hardware compatibility flag.

11. The method of claim 1 wherein the analog identification indicium includes a finder pattern and wherein the appearance of the finder pattern is also altered by a compatible stimulus mechanism.

12. A system for authenticating a product comprising:
   the product including:
      an analog identification indicium comprising a pattern of identification features affixed to the product, the analog identification indicium including identifier features having an appearance that is altered when exposed to a compatible stimulus mechanism and wherein the identifier features can be decoded to represent an item indentifier when the appearance of the identifier features is altered by a compatible stimulus mechanism;
      a hardware compatibility flag that indicates at least one compatible stimulus mechanism that alters the identifier features such that the item identifier can be determined;
      a digital identifier including an encoded version of the item identifier; and
   an imaging device including one or more stimulus mechanisms and an imaging system for generating an image of the analog identification indicium and the digital identifier;
   the imaging device further including circuitry for:
      reading and analyzing the hardware compatibility flag to determine whether a compatible stimulus mechanism is present;
      activating a compatible stimulus mechanism;
      analyzing the image of the identification features and decoding an item identifier;
      analyzing the image of the digital identifier and decoding an item identifier; and
      comparing the item identifier determined from the analog identification indicium to the item identifier determined from the digital identifier to authenticate the product.

13. The system of claim 12 wherein a compatible stimulus mechanism is ultraviolet light having a wavelength within a particular range of wavelengths.

14. The system of claim 12 wherein a compatible stimulus mechanism is visible light.

15. The system of claim 12 wherein the hardware compatibility flag is encoded in the digital identifier.

16. The system of claim 12 wherein the hardware compatibility flag is part of the analog identification indicium.

17. The system of claim 16 wherein the hardware compatibility flag is one or more attributes of a finder pattern of the analog identification indicium.

18. The system of claim 17 wherein the appearance of the finder pattern is altered such that it can be identified when exposed to a compatible stimulus.

19. The system of claim 12 including circuitry that alters a user if a compatible stimulus mechanism is not included in the system.

20. Computer readable media having computer-executable instructions stored thereon for identifying or authenticating a product with a bar code scanner, the product being marked with a digital identification record and an analog identification indicium and wherein the analog identification indicium includes identification features having an appearance that is altered when exposed to a compatible stimulus mechanism, the identification features corresponding to an item identifier that can be determined when the identification features are stimulated by a compatible stimulus mechanism, the steps comprising:
  analyzing a hardware compatibility flag on the product and determining if a compatible stimulus mechanism has been provided;
  if a compatible stimulus mechanism has been provided, activating the compatible stimulus mechanism to read the pattern of identification features of the analog identification indicium and decode an item identifier;
  reading a digital identification record and decoding an item identifier;
  determining authenticity of the product by comparing the item identifier determined from the analog identification indicium to the item identifier determined from the digital identification; and
  providing an output signal to a user of the bar code scanner based on the determinated authenticity of the product.

21. The computer readable media of claim 20 wherein the computer-executable instructions include the step of alerting a user that a compatible stimulus mechanism has not been provided if a compatible stimulus mechanism has not been provided.

22. The computer-readable media of claim 20 wherein the hardware compatibility flag is part of the digital identification record.

23. The computer-readable media of claim 20 wherein the hardware compatibility flag is part of the analog identification indicium.

24. A system for authenticating a product comprising:
  the product including:
    analog identification means comprising a pattern of identification features affixed to the product, the analog identification means including identifier features having an appearance that is altered when exposed to a compatible stimulus mechanism and wherein the identifier features can be decoded to represent an item identifier when the appearance of the identifier features is altered by a compatible stimulus mechanism;
    a hardware compatibility identifier means that indicates at least one compatible stimulus mechanism that alters the identifier features such that the item identifier can be determined;
    a digital identifier means including an encoded version of the item identifier; and
  an imaging device including one or more stimulus mechanisms and an imaging system for generating an image of the analog identification means and the digital identifier;
  the imaging device further including means for:
    reading and analyzing the hardware compatibility flag to determine whether a compatible stimulus mechanism is present;
    activating a compatible stimulus mechanism;
    analyzing the image of the identification features and decoding an item identifier;
    analyzing the image of the digital identifier means and decoding an item identifier; and
    comparing the item identifier determined from the analog identification means to the item identifier determined from the digital identifier means to authenticate the product.

25. The system of claim 24 including alerting means that alerts a user if a compatible stimulus mechanism is not included in the system.

* * * * *

UNITED STATES PATENT AND TRADEMARK OFFICE
CERTIFICATE OF CORRECTION

| | | |
|---|---|---|
| PATENT NO. | : 7,309,011 B2 | Page 1 of 1 |
| APPLICATION NO. | : 11/140794 | |
| DATED | : December 18, 2007 | |
| INVENTOR(S) | : He | |

It is certified that error appears in the above-identified patent and that said Letters Patent is hereby corrected as shown below:

IN THE CLAIMS

1. In Column 14, Line 37, In Claim 12, delete "indentifier" and insert -- identifier --, therefor.

2. In Column 15, Line 37, In Claim 20, delete "identification;" and insert -- identification record; --, therefor.

Signed and Sealed this

Twenty-ninth Day of December, 2009

David J. Kappos
*Director of the United States Patent and Trademark Office*